(12) United States Patent
Jain

(10) Patent No.: US 7,996,674 B2
(45) Date of Patent: Aug. 9, 2011

(54) LDAP USER AUTHENTICATION

(75) Inventor: Dinesh Tejmal Jain, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/551,017

(22) Filed: Oct. 19, 2006

(65) Prior Publication Data

US 2008/0098460 A1    Apr. 24, 2008

(51) Int. Cl.
H04L 9/32    (2006.01)
(52) U.S. Cl. ....................................... 713/168
(58) Field of Classification Search ....... 726/4; 713/168
See application file for complete search history.

(56) References Cited

U.S. PATENT DOCUMENTS

| | | | |
|---|---|---|---|
| 2002/0087718 A1* | 7/2002 | Hill et al. ....................... | 709/237 |
| 2004/0019680 A1* | 1/2004 | Chao et al. ...................... | 709/226 |
| 2005/0283615 A1 | 12/2005 | Chakravarthi et al. | |
| 2006/0092948 A1* | 5/2006 | Katz et al. ................ | 370/395.52 |

OTHER PUBLICATIONS

StoneLion, "Linux LDAP authentication", Linux.com, The Enterprise Linux resource,pp. 1-5 retrieved Sep. 20, 2006. http://enterprise.linux.com/print.pl?sid=05/09/15/1930256.
Harbaugh, "Radiant Logic, MaXware give directories a virtual twist—RadiantOne, MaXware Virtual Directory present a variety of data sources as one directory", Sep. 3, 2004, pp. 1-3. http://www.infoworld.com/article/04/09/03/36TCvirtual_1.html.
Gnirss et al., "Advanced LDAP User Authenticaiton: Limiting Access to Linux Systems Using the Host Attribute", Redbooks Paper, IBM Corp 2004, pp. 1-10.
Radtke, "System Authentication for AIX and Linux using the IBM Directory Server", Technique Paper, International Business Machines Corporation 2002, Version 1.0, pp. 1-28.
Gietz, "OpenCA and LDAP Authentication and LDAP based certificate requests", OpenCA Workshop, TU Munchen, Nov. 18, 2005, DAASI International, pp. 1-24.
"ProFTPD Virtual Users", pp. 1-3 retrieved Oct. 17, 2006 http://www.castaglia.org/proftpd/doc/contrib/ProFTPD-mini-HOWTO-VirtualUsers.html.
"Security Guide LDAP Authentication Load Module", pp. 1-16, retrieved Oct. 17, 2006. http://inmetsd01.boulder.ibm.com/pseries/en_US/aixbman/security/ldap_exploitation.htm.
Clark, "Practical LDAP on Linux—A practical guide to integrating LDAP directory services on Linux", metaparadism, Aug. 23, 2002, pp. 1-28.
Klatsky, "Virtual—ldap difficulty", Feb. 7, 2002, pp. 1-2, retrieved Oct. 17, 2006. http://www.irbs.net/internet/postfix/0202/0611.html.
Esche et al., "LDAP and Active Directory: Working Together to Manage Identity", University of Calgary, pp. 1-39.
"Integrating Oracle9iAS with NetPoint SSO, Netpoint Identity-Based Security Solutions", Chapter 5,Oblix Inc., Sep. 2003, pp. 193-206.
"Introduction to NetPoint", Oracle COREid Access and Identity, 10g Release 2 (10.1.2), Part No. B19006-01, May 2005, pp. 1-88.

* cited by examiner

*Primary Examiner* — Edan Orgad
*Assistant Examiner* — Harris C Wang
(74) *Attorney, Agent, or Firm* — Yee & Associates, P.C.; David A. Mims, Jr.

(57) ABSTRACT

A computer implemented method and data processing system for authenticating a user. A control module receives a user authentication request. The control module retrieves a server's parameters, and uses the server's parameters to form a customized user authentication request. The control module sends the customized user authentication request to the server, and receives an authentication response from the server.

6 Claims, 3 Drawing Sheets

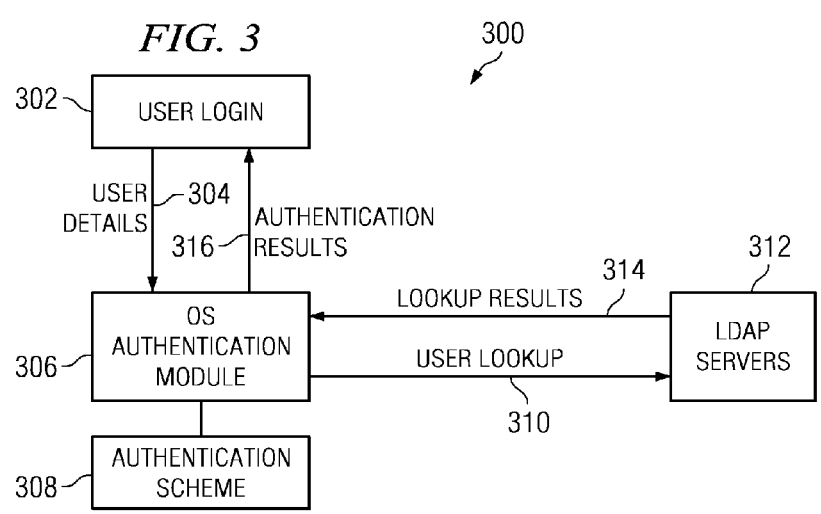
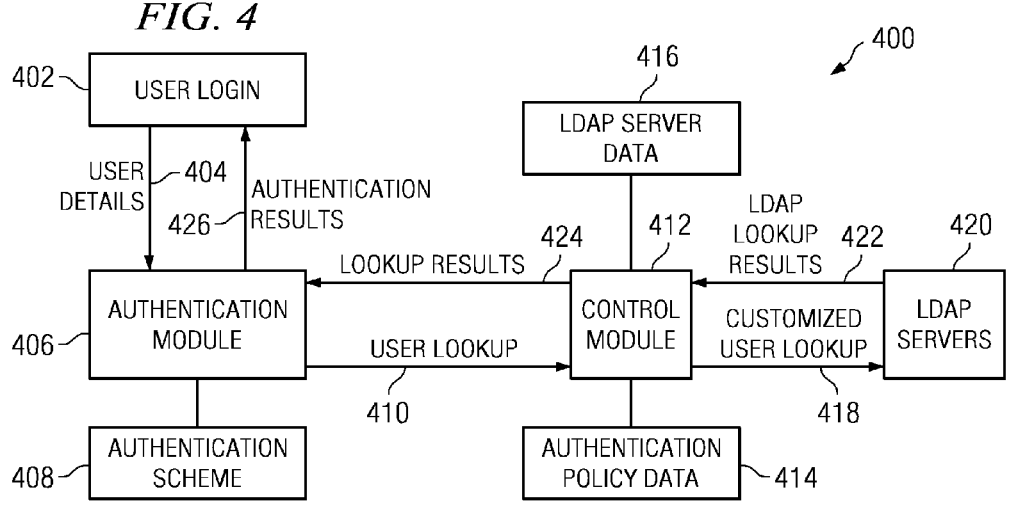

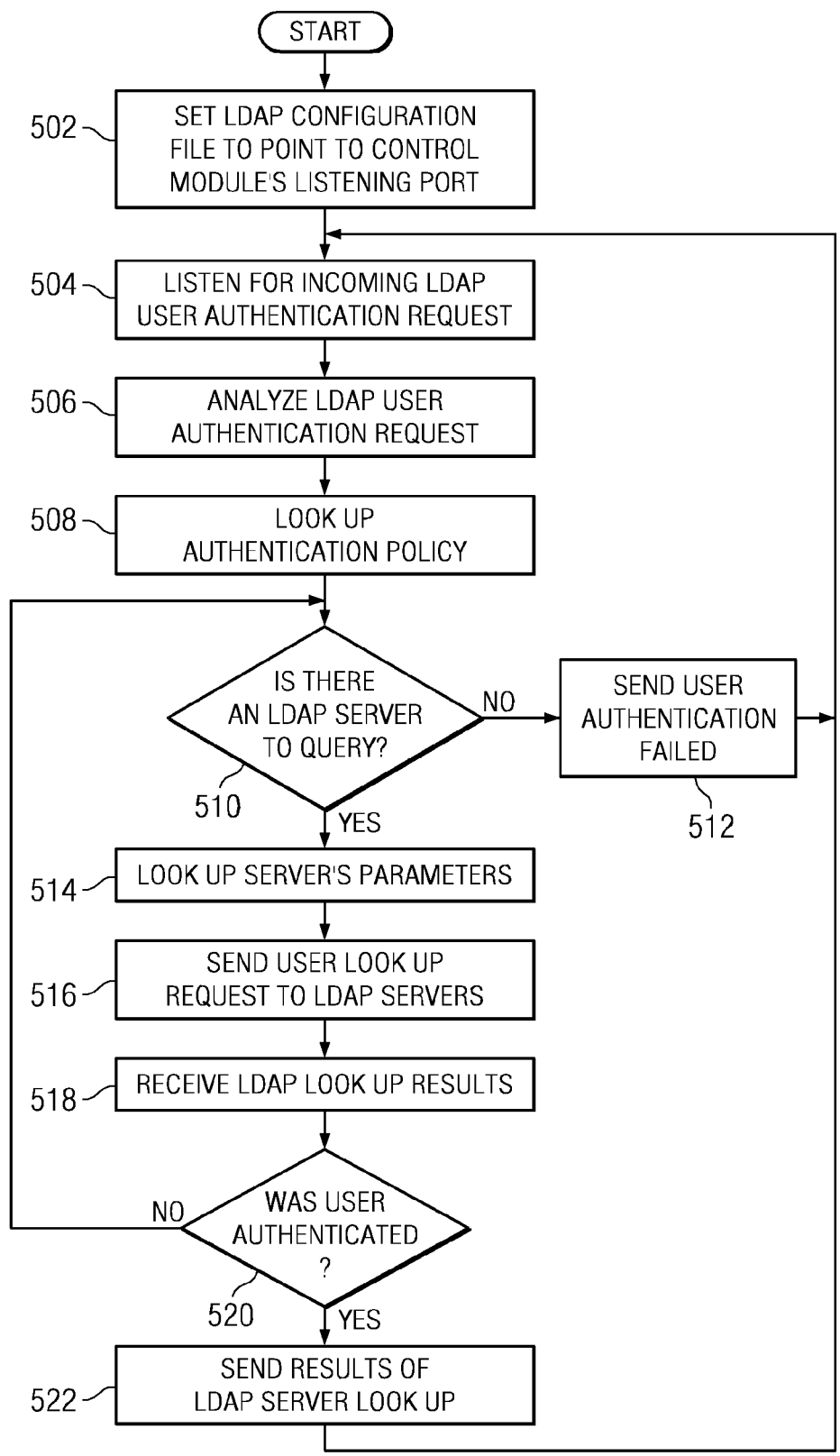

LDAP USER AUTHENTICATION

BACKGROUND OF THE INVENTION

1. Field of the Invention

The present invention relates generally to data processing systems and in particular to using servers for user authentication. Still more particularly, the present invention relates to a computer implemented method and data processing system for user authentication using Lightweight Directory Access Protocol (LDAP).

2. Description of the Related Art

When a user performs a login on a computer connected to a network, the computer attempts to authenticate the user to determine whether the user is allowed to access the computer, and through the computer, allowed access to a subset of the network. One method to authenticate a user is to use Lightweight Directory Access Protocol (LDAP).

If the operating system of the computer is configured to authenticate using LDAP authentication, then the computer authenticates the user by sending an authentication request to one or more LDAP servers. LDAP servers store user information such as the user's username, password, type of account, and home directory. Each server uses this information to determine whether the user is allowed access to the computer, and through the computer, allowed access to a subset of the network.

A user authentication request contains specific information about the user and about the LDAP server authenticating the user. User details such as the user's username and password are collected from the user when the user tries to login to the computer. Details about the LDAP server are contained in a configuration file in the operating system. When the user authentication request is sent to one or more LDAP servers, the request is successfully processed by a specific LDAP server only if the request contains the parameters specific to that LDAP server. If the LDAP server's parameters vary even slightly from the information in the user authentication request, then the LDAP server will not be able to successfully process the user authentication request and not allow the user to login.

One way to ensure that all LDAP servers successfully process the user authentication request is to configure certain parameters for all the LDAP servers identically. For example, the LDAP servers could be configured so that each LDAP server has the same search base, same distinguished name to bind the server with, same port number, and requires that the user name be specified in the same way. However, configuring all the LDAP servers so that certain parameters are identical is typically difficult to do and often not desirable.

For example, a geographically dispersed organization might be divided into multiple regions, such as North America, Europe, and Asia, with each region having its own regional LDAP server. In this example, each region has a different search base (the location from which the search begins), but the user authentication request can only specify one of the three search bases.

Therefore, the current method of authenticating a user with multiple LDAP servers requires that all the servers be configured identically or else the servers will not authenticate the user. Configuring the servers identically is difficult and may not be desirable.

SUMMARY OF THE INVENTION

The different embodiments provide a computer implemented method and apparatus for authenticating a user. A control module receives a user authentication request. The control module retrieves a server's parameters, and uses the server's parameters to form a customized user authentication request. The control module sends the customized user authentication request to the server, and receives an authentication response from the server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of software components in a conventional user authentication scheme;

FIG. 4 is a block diagram of software components in a user authentication scheme in accordance with an illustrative embodiment; and FIG. 5 depicts a flowchart illustrating the operation of a control module in accordance with an illustrative embodiment of the present invention.

DETAILED DESCRIPTION OF THE PREFERRED EMBODIMENT

Figure 1:
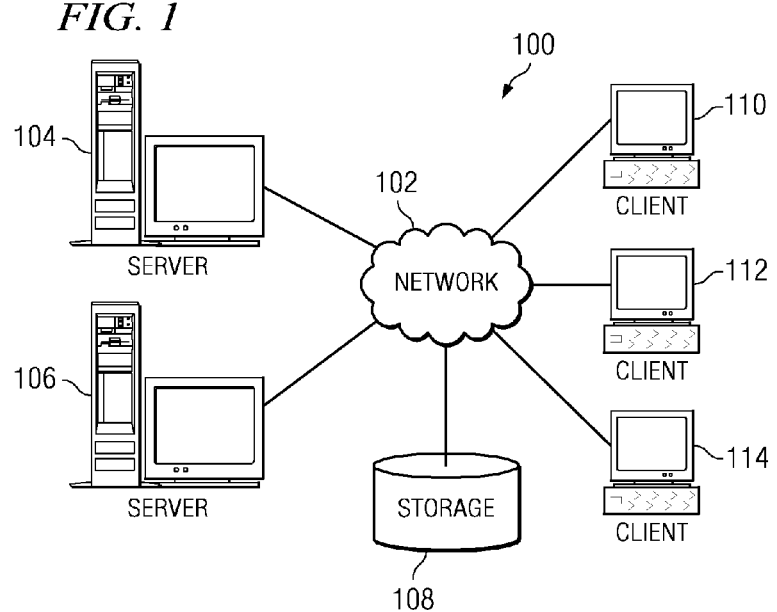
FIG. 1 depicts a pictorial representation of a network of data processing systems in accordance with an illustrative embodiment.
Figure 2:
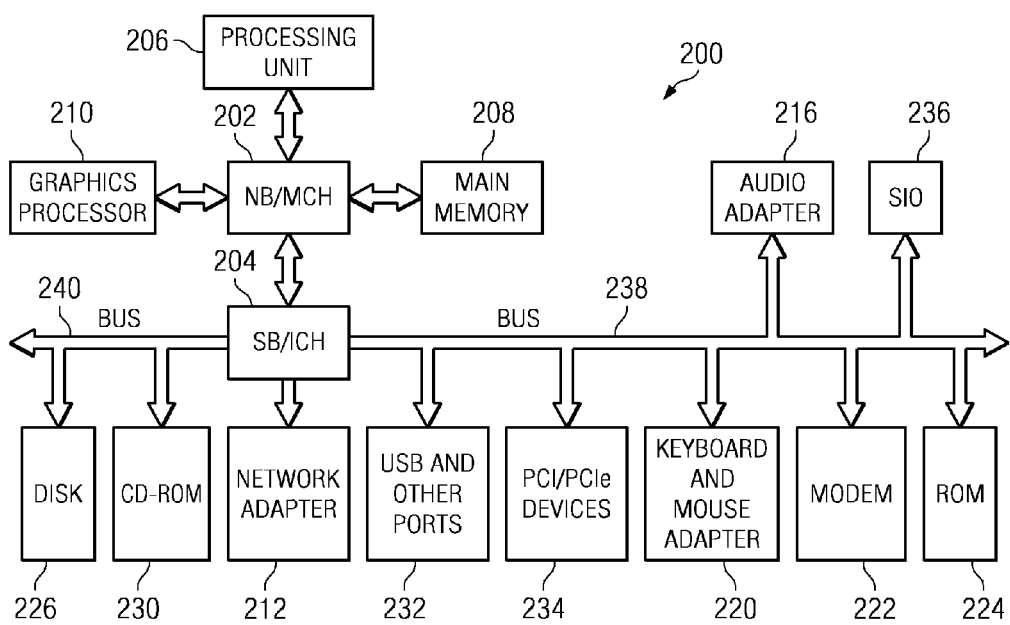
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments provide a computer implemented method and data processing system for authenticating a user. A control module receives a user authentication request. The control module retrieves a server's parameters, and uses the server's parameters to form a customized user authentication request. The control module sends the customized user authentication request to the server, and receives an authentication response from the server indicating whether or not the user is authenticated.

Referring to FIG. 3, reference numeral 300 depicts a block diagram of software components in a conventional user authentication scheme. When a user login 302 occurs on a computer which is connected to a network, the computer attempts to authenticate the user and determine whether the user is permitted to login to the computer.

To authenticate the user, user login 302 gathers details about the user, such as the user's username and password, and then sends user details 304 to the computer's operating system. The operating system's authentication module 306 then checks authentication scheme 308 to determine how authentication should be done. Authentication scheme 308 contains details of the authentication scheme, such as the LDAP configuration file. In a Unix-based system, the LDAP configuration file is typically in the "ldap.conf" file. Authentication scheme 308 may also contain information about other system authentication resources that have been configured using, for example, the authconfig command.

Those versed in the art will appreciate that user login 302, authentication module 306 and authentication scheme 308 are each software components that may be located on a single computer, or on a distributed, client-server network.

Once authentication module 306 has looked up the appropriate authentication scheme, authentication module 306 sends user lookup 310 to one or more Lightweight Directory Access Protocol (LDAP) servers 312. User lookup 310 contains specific information (parameters) relating to both the user and the server. For example, the user information may include the user's username and password, and the server information may include the search base and port number. User lookup 310 is also known as a user authentication request.

While LDAP servers 312 is depicted as a single block for the purpose of clarity, those versed in the art will appreciate that LDAP servers 312 represents more than one LDAP server. LDAP servers 312 store user information (user attributes) such as the user's user-id, password, type of account, and home directory. Authentication module 306 sends user lookup 310 to a first LDAP server, and if that first LDAP server does not authenticate the user then authentication module 306 sends user lookup 310 to a second LDAP server, and so on, until one of the LDAP servers 312 authenticates the user or there are no more LDAP servers left to send a request to.

LDAP servers typically run Unix®, or a variant of Unix such as Linux®, Solaris®, HP-UX®, or AIX®. Unix, Linux, Solaris, HP-UX, or AIX are trademarks of The Open Group, Linus Torvalds, Sun Microsystems, Hewlett-Packard, and International Business Machines (IBM), respectively. The illustrative embodiments may be used with LDAP servers running Unix® or any of the various Unix® variants.

If a network has two or more LDAP servers, with each LDAP server having different parameters, then, because authentication module 306 does not know about the parameters specific to each LDAP server, authentication module 306 cannot send a user lookup request that is customized for the parameters for a specific LDAP server. In other words, if a network has two or more LDAP servers, the LDAP servers cannot properly process and respond to a user authentication request unless all the LDAP servers have the same parameters, such as, for example, the same search base, same distinguished name to bind the server with, same port number, and the same user information.

If LDAP servers 312 are not all configured identically, then the key parameters of user lookup 310 will not match the configuration of one or more LDAP servers. If the parameters in user lookup 310 do not match the configuration of a server, then LDAP lookup results 314 will indicate that the user could not be found, authentication results 316 will indicate that the user could not be authenticated, and the user will not be allowed to login.

Thus, there are at least two problems with using a conventional user authentication system. First, it is time-consuming and difficult to configure each LDAP server in the network so that specific user authentication parameters are identical. Second, it is often not possible or desirable to configure each LDAP server identically.

For example, a geographically dispersed organization might be divided into multiple regions, such as North America, Europe, and Asia, with each region having its own regional LDAP server. A conventional user authentication system typically cannot handle a network where each LDAP server has a different search base.

Similarly, many LDAP servers use different ways of specifying a user's username. For example, some LDAP servers use "cn", while other LDAP servers use "uid". In a conventional system, all LDAP servers must use the same way of specifying the user's username or the user will not be permitted to login.

Another limitation on conventional systems occurs when specific LDAP servers are running secure socket layer (SSL) while others are not. In a conventional system, all LDAP servers must either run SSL or not run SSL, a mixed network of LDAP servers is not possible. Therefore, the illustrative embodiments recognize a need to be able to process user authentication requests in a network with LDAP servers that are not configured identically.

Referring to FIG. 4, a block diagram of software components of a user authentication scheme in accordance with an illustrative embodiment. When a user login 402 occurs on a computer, the computer operating system's authentication module 406 first checks authentication scheme 408 and then sends a user lookup 410. User lookup 410 is also known as a user authentication request. User lookup 410 contains information from user details 404, such as the user's username and password.

Those versed in the art will appreciate that user login 402, authentication module 406 and authentication scheme 408 are each software components that may be located on a single computer, or on a distributed, client-server network.

Authentication module 406 sends user lookup 410. In a conventional user authentication system, such as the one depicted in FIG. 3, the LDAP servers receive user lookup 410. In an illustrative embodiment, however, control module 412 receives user lookup 410. Control module 412 is a software process that registers itself with the operating system and behaves like an LDAP server when interacting with authentication module 406. Control module 412 takes a user lookup and converts it into a customized user lookup request that contains the specific parameters for one or more specific LDAP servers.

Upon receiving user lookup 410, control module 412 looks up the parameters associated with an LDAP server in LDAP server data 416 and then sends a customized user lookup 418. Customized user lookup 418 contains information about the user, such as the user's username and password, and information about the LDAP server.

LDAP server data 416 contains information about each LDAP server. This information includes each LDAP server's specific parameters, such as, for example, the server's search base, distinguished name, and port number. Typically, the default operation of control module 412 is to read the parameters for one LDAP server at a time from LDAP server data 416, and create and send a customized user lookup request to each LDAP server, until an LDAP server authenticates the user or no more LDAP servers are left to send customized user lookup requests to.

Because a customized user authentication request is created containing the specific parameters of the LDAP server being queried, the network may contain two or more LDAP servers, with each LDAP server configured uniquely, and each uniquely configured LDAP server will receive a user authentication request containing the parameters unique to that LDAP server.

Another advantage of using control module 412 is that, optionally, authentication policy data 414 may be created. If created, authentication policy data 414 contains one or more authentication policies which allow specific users access to specific portions of the network. Authentication policies may be implemented as user specific, LDAP specific, or a combination of the two. If authentication policy data 414 has been created, then control module 412 first checks authentication policy data 414 to determine if there is a relevant authentication policy before accessing LDAP server data 416.

For example, an authentication policy in authentication policy data 414 may be "authenticate user A only using LDAP server X". In this example, if user A attempts to login, control module 412 checks authentication policy data 414 and finds the policy specifying that user A is to be authenticated only using LDAP server X. Then, control module 412 looks up the parameters for LDAP server X in LDAP server data 416, and sends only one customized user lookup 418.

An authentication policy may thus specify that a user, or a group of users, be authenticated against a subset of all the available LDAP servers. For example, an authentication policy might specify "authenticate users A, B, and C only using LDAP server X, Y, and Z". An advantage of using authentication policies is that control module 412 sends customized user lookup 418 only to the LDAP server or servers specified in the authentication policy, instead of every available LDAP server.

Another example of using authentication policies occurs when a company has three regional LDAP servers, with one each for North America, Europe, and Asia. One authentication policy may allow North American users to login only to the North American portion of the network, another authentication policy may allow European users to login only to the European network, and so on. In this way, the network can be portioned in such a way that only certain users can login to certain computers on the network.

In another illustrative embodiment, a policy is created to allow only employees at a certain responsibility level access to a computer. In this way, any user with a responsibility level below a level specified in the authentication policy would not be authenticated, and thus would not be allowed to login. If the responsibility level is, for example, manager, then the authentication policy would allow only managers to login.

Control module 412 sends customized user lookup 418 to LDAP servers 420. Customized user lookup 418 is a user authentication request containing the user's username and password, as well the specific parameters for the LDAP server being sent the user authentication request. LDAP servers 420 contains one or more LDAP servers and is shown as one block in FIG. 4 for the purpose of clarity only. Because customized user lookup 418 contains the specific parameters for the specific server that the user should be authenticated on, each LDAP server may be configured so that each LDAP server does not have the exact same parameters as any other LDAP server.

Once the specific LDAP server within LDAP servers 420 receives customized user lookup 418, the LDAP server attempts to authenticate the user. In authenticating the user, the specific LDAP server receiving the customized user lookup looks up the user's associated information and determines whether that user is allowed to login to the computer. For example, the LDAP server might determine whether a user should be allowed to login by comparing the user supplied username and password with the username and password stored in the LDAP server. If the supplied username and password match the stored username and password, then the user is authenticated. If they do not match, then the user is not authenticated and the user's login is denied.

If LDAP servers 420 determines that the user should be authenticated and allowed to login to the computer, then LDAP lookup results 422 indicates that the user has been authenticated, and is permitted to login. If the LDAP server determines that the user should not be allowed access because, for example, the password used to login does not match the password the LDAP server has on file, then LDAP lookup results 422 indicates that the user was not authenticated and is denied permission to login.

Control Module 412 receives LDAP lookup results 422, and sends LDAP lookup results 424 to authentication module 406. Control Module 412 sends the same information it received, and therefore LDAP lookup results 422 and LDAP lookup results 424 typically may be similar or identical in content and format.

Authentication module 406 examines LDAP lookup results 424, determines whether the user should be allowed to login, and then sends authentication results 426 back to user login 402. If the user authentication was successful, then authentication results 426 indicate that the user is permitted to login. If the user authentication was not successful, then authentication results 426 indicate that the user is not permitted to login.

Referring to FIG. 5, a flowchart illustrating the operation of a control module is shown in accordance with an embodiment of the present invention. In this illustrative example shown in FIG. 5, the process is implemented by a control module, such as control module 412 in FIG. 4.

The process begins when the control module registers with the operating system's authentication module by setting the LDAP configuration file, such as ldap.conf, to point to the control module's listening port (step 502). The control module then listens for an incoming LDAP user authentication request (step 504). Once the control module receives an incoming LDAP user authentication request, the control module analyzes the LDAP user authentication request to extract information such as the user's username, password, and which network domain the user is attempting to login to (step 506).

The control module may, optionally, look up one or more authentication policies (step 508). If one or more authentication policies are present and are relevant to this particular user's login, then the control module examines the relevant authentication policies. The authentication policies may specify one or more LDAP servers to use for authenticating the user.

The control module makes a determination as to whether there is a LDAP server to send a query (user lookup request) regarding this user's login (step 510). If the answer is yes and there is an LDAP server that the control module can send a user lookup request to, then the control module looks up the parameters associated with the LDAP server (step 514).

If one or more authentication polices are relevant to this user's login, then the control module may lookup the parameters for the LDAP server or servers based on the authentication policy. If no authentication policy was created, or there is not an authentication policy relevant to this user login, then the control module may lookup the parameters for the first LDAP server.

The control module sends a user look up request to the LDAP server (step 516). The user look up request is also known as a user authentication request, and contains information about the user, such as the user's username and password, and the specific parameters of the server, such as the search base, and port number.

The control module receives the LDAP lookup results from the LDAP server (step 518), and makes a determination as to whether the user was authenticated (step 520). If the control module determines that, yes, the user was authenticated, then the control module sends the LDAP lookup results back to the operating system's authentication module (step 522), and goes back to listening for incoming LDAP user authentication requests (504).

If the control module determines that, no, the user was not authenticated (step 520), then the control module checks if there is another LDAP server that can be queried (step 510). If there are no more LDAP servers to query, then the control module sends a message to the operating system's authentication module indicating that the user authentication failed (step 512), and the control module goes back to listening for incoming user authentication requests (step 504). If there are more LDAP servers to query, then the control module looks up the server's associated parameters (step 514), and the process continues as described above.

Thus, different embodiments provide a computer implemented method and data processing system for authenticating a user. A control module receives a user authentication request. The control module retrieves a server's parameters, and uses the server's parameters to form a customized user authentication request. The control module sends the customized user authentication request to the server, and receives an authentication response from the server indicating whether or not the user is authenticated.

The user authentication embodiment described above offers several advantages over conventional user authentication schemes. First, LDAP servers need not be configured identically. Instead, LDAP servers may be configured in ways that are meaningful to the organization and the corresponding network, such as giving each portion of the network a unique search base name. In addition, by creating authentication policies, the login for an entire group of users may be defined, and user authentication can be made more efficient by not having to query every LDAP server on the network.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for user authentication, the computer implemented method comprising:
   registering with an operating system to perform user authentication requests by a control module;
   configuring for each of a plurality of lightweight directory access protocol servers a set of parameters for performing lightweight directory access protocol server requests by the control module;
   configuring a plurality of authentication policies defining rules for selecting a set of lightweight directory access protocol servers for performing user authentication requests by the control module;
   receiving a user authentication request by the control module;
   responsive to receiving the user authentication request, retrieving and using the plurality of authentication policies to select the set of lightweight directory access protocol servers from the plurality of lightweight directory access protocol servers for performing the user authentication request;
   retrieving the set of parameters of a lightweight directory access protocol server of the set of lightweight directory access protocol servers, wherein the set of parameters of the lightweight directory access protocol server includes at least search base indicating a location of user authentication data, a distinguished name of the lightweight directory access protocol server, a port number used by the lightweight directory access protocol server, whether or not the lightweight directory access protocol server runs secure socket layer, and a manner in which a username is specified;
   using the set of parameters of the lightweight directory access protocol server to modify the user authentication request to form a customized user authentication request;
   sending the customized user authentication request to the lightweight directory access protocol server; and
   responsive to sending the customized user authentication request, receiving an authentication response from the lightweight directory access protocol server.

2. The method of claim 1, wherein the authentication response indicates whether or not the user is authenticated and if the user is not authenticated retrieving and using the set of parameters for each remaining lightweight directory access protocol server of the set of lightweight directory access protocol servers to modify the user authentication request to form and send customized user authentication requests to each remaining lightweight directory access protocol server until receiving an authentication response that the user is authenticated.

3. The method of claim 1, wherein the authentication policy specifies at least two lightweight directory access protocol servers for the user authentication request.

4. A data processing system for user authentication, the data processing system comprising:
   a bus;
   a storage device connected to the bus, wherein the storage device contains computer usable code;
   a communications unit connected to the bus; a processing unit connected to the bus; and a control module, wherein the control module performs the steps including:
   registering with an operating system to perform user authentication requests;
   configuring for each of a plurality of lightweight directory access protocol servers a set of parameters for performing lightweight directory access protocol server requests;
   configuring a plurality of authentication policies defining rules for selecting a set of lightweight directory access protocol servers for performing user authentication requests;
   receiving a user authentication request;
   responsive to receiving the user authentication request, retrieving and using the plurality of authentication policies to select the set of lightweight directory access protocol servers from the plurality of lightweight directory access protocol servers for performing the user authentication request;
   retrieving the set of parameters of a lightweight directory access protocol server of the set of lightweight directory access protocol servers, wherein the set of parameters of the lightweight directory access protocol server includes at least a search base indicating a location of user authentication data, a distinguished name of the lightweight directory access protocol server, a port number used by the lightweight directory access protocol server, whether or not the lightweight directory access protocol server runs secure socket layer, and a manner in which a username is specified,
   using the set of parameters of the lightweight directory access protocol server to modify the user authentication request to form a customized user authentication request;
   sending the customized user authentication request to the lightweight directory access protocol server; and
   responsive to sending the customized user authentication request, receiving an authentication response from the lightweight directory access protocol server.

5. The data processing system of claim 4, wherein the authentication response indicates whether or not the user is authenticated and if the user is not authenticated retrieving and using the set of parameters for each remaining lightweight directory access protocol server of the set of lightweight directory access protocol servers to modify the user authentication request to form and send customized user authentication requests to each remaining lightweight directory access protocol server until receiving an authentication response that the user is authenticated.

6. The data processing system of claim 4, wherein the authentication policy specifies at least two lightweight directory access protocol servers for the user authentication request.

* * * * *